United States Patent [19]

Garnett et al.

[11] 4,095,774
[45] Jun. 20, 1978

[54] CAM REGULATED FLOW CONTROL VALVE

[76] Inventors: Bruce L. Garnett, Rte. 2, DePere, Wis. 54115; John R. Herman, 3283 Davies, Green Bay, Wis. 54302

[21] Appl. No.: 763,912

[22] Filed: Jan. 31, 1977

[51] Int. Cl.² ............................................. F16K 31/12
[52] U.S. Cl. ..................................... 251/44; 251/254; 198/347
[58] Field of Search ............... 198/347, 444, 469, 502, 198/572, 573, 577, 856, 857; 251/25, 43, 44, 251, 254, 290, 38; 91/49, 418, 468, 376 R, 378; 417/46; 137/624.17

[56] References Cited

U.S. PATENT DOCUMENTS

| 1,511,009 | 10/1924 | Spear | 251/43 |
|---|---|---|---|
| 2,775,957 | 11/1957 | Anderson | 91/378 |
| 2,795,391 | 6/1957 | Krone et al. | 251/43 |
| 2,813,519 | 11/1957 | Persson et al. | 91/378 |
| 2,933,283 | 4/1960 | Kreis | 251/254 |
| 2,985,277 | 5/1961 | Prellwitz | 198/502 |
| 3,623,596 | 11/1971 | Garvey | 198/347 |
| 3,929,218 | 12/1975 | Risley | 198/577 |

*Primary Examiner*—Evon C. Blunk
*Assistant Examiner*—Joseph E. Valenza
*Attorney, Agent, or Firm*—James E. Nilles

[57] ABSTRACT

A conveyor system comprises a conveyor drivable at variable speeds by a hydraulic motor which is controlled by a cam regulated flow control valve. Sensing means responsive to some condition on the conveyor requiring a change in speed (i.e., excessive accumulation of conveyed articles requiring conveyor slowdown) are connected to the cam on the flow control valve to effect a corresponding change in conveyor speed. The valve amplifies the relatively small fluid control signal therewithin to effect control of relatively high pressure fluid. The valve comprises a movable poppet whose position determines the rate of flow between a fluid inlet and a controlled fluid outlet port connected to the hydraulic motor, a movable piston for positioning the poppet, a movable shut-off member for regulating piston position by controlling fluid pressure applied to the piston from the fluid inlet, and an adjustable cam to establish the position of the shut-off member and thereby control fluid flow to the motor and control conveyor speed. The cam comprises a plurality of differently shaped cam segments, and is manually adjustable initially to enable the selection of a desired segment. The cam is movable by the sensing means across the range of the selected cam segment to provide fluid flow between zero and some maximum flow rate at the controlled fluid outlet port, rate of flow being determined by the position and the shape of the selected cam segment. The four cam segments, for example, enable flow rates between 0 to 4 gallons per minute (gpm), 0 to 5 gpm, 0 to 6 gpm, and so on, depending on the number and shape of segments on the cam surface.

9 Claims, 5 Drawing Figures

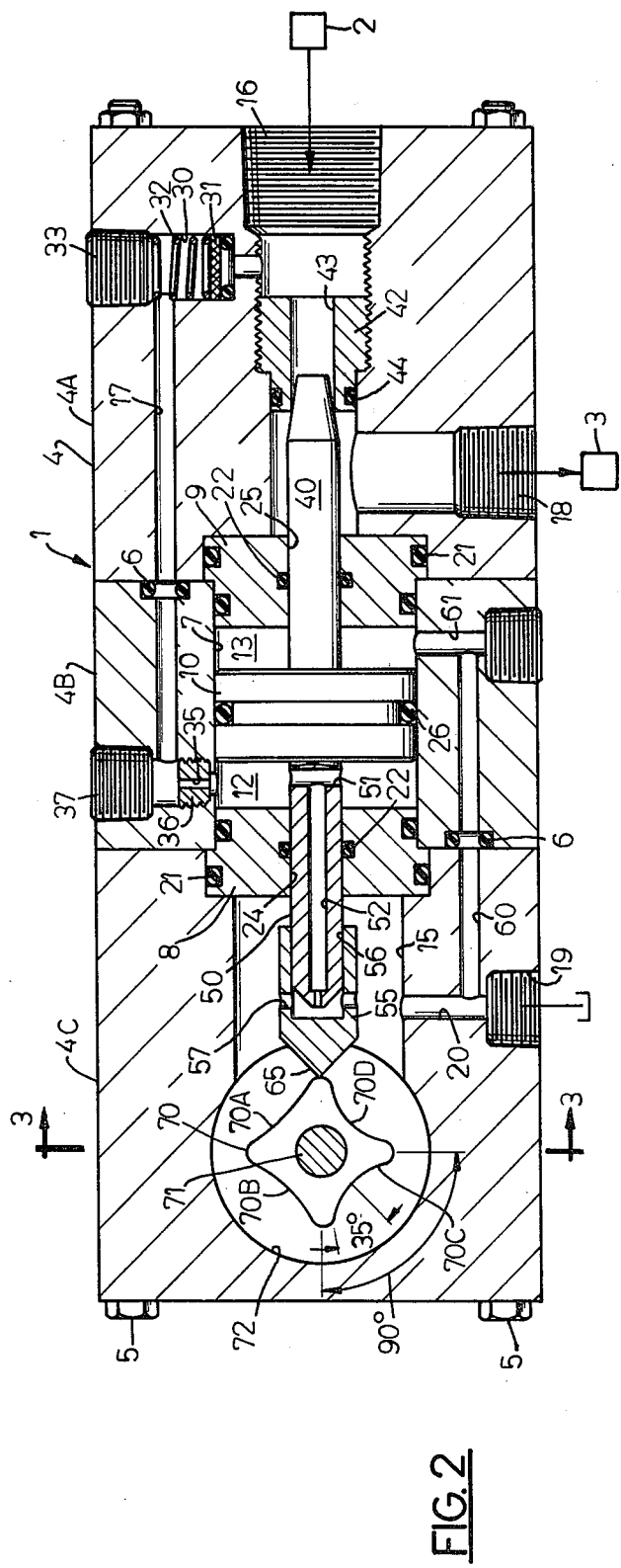
FIG.2
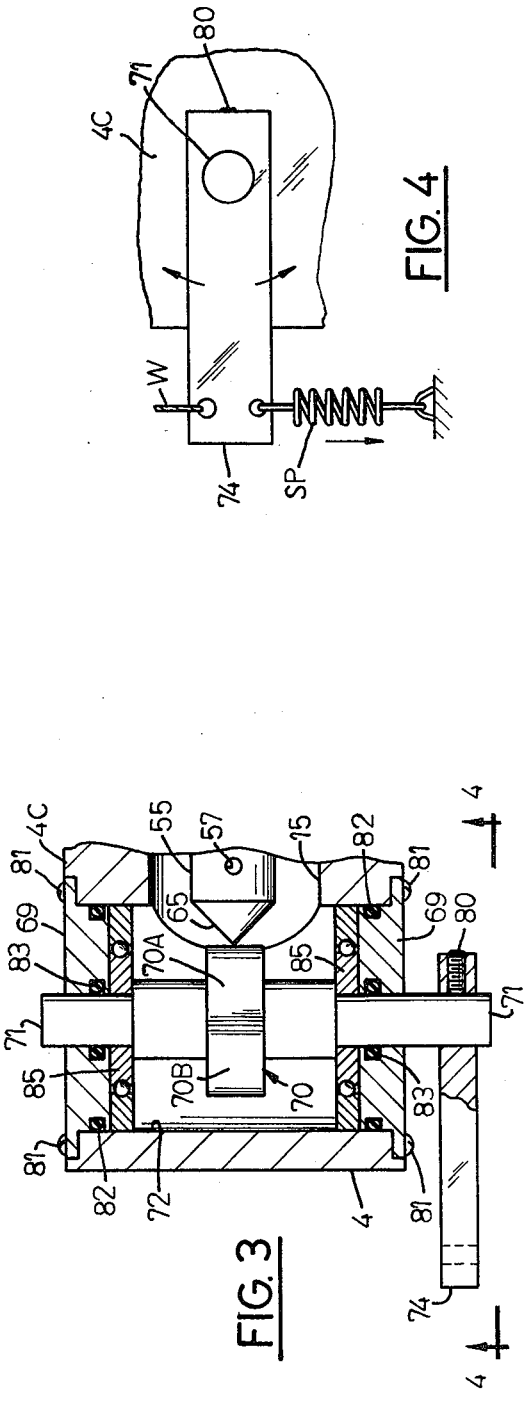
FIG.3
FIG.4

CAM REGULATED FLOW CONTROL VALVE

BACKGROUND OF THE INVENTION

1. Field of Use

This invention relates generally to hydraulic control systems employing flow control valves. In particular, it relates to cam operated flow control valves which are responsive to a system condition to effect control of a hydraulic component in the system.

2. Description of the Prior Art

Some conveyor systems, for example, comprise a conveyor drivable at variable speeds by a hydraulic motor which is controlled by a flow control valve. Sensing means responsive to some condition on the conveyor requiring a change in speed (i.e., excessive accumulation of conveyed articles requiring conveyor slow-down) are connected to the flow control valve to effect a corresponding change in conveyor speed. Such a prior art flow control valve typically embodies a valve stem which is connected to a lever in the sensing means which rotates the stem to enable the rate of fluid flow through the valve to be established at any flow rate between zero gallons per minute (gpm) and the maximum flow rate of which the valve is capable. However, since the valve stem is operating directly against relatively high fluid pressure in the system (on the order of 1000psi, for example), the sensing means lever needs to exert great force to operate the valve. Furthermore, because of high system pressure, leakage occurs around the rotatable valve stem and sealing is a problem.

SUMMARY OF THE PRESENT INVENTION

In accordance with the present invention, there is provided a conveyor system which comprises a conveyor drivable at variable speeds by a hydraulic motor which is controlled by a cam regulated flow control valve. Sensing means, including a spring-biased movable lever, responsive to some condition on the conveyor requiring a change in speed (i.e., excessive accumulation of conveyed articles requiring conveyor slow-down) is connected to an adjustable movable cam on the flow control valve to effect a corresponding change in conveyor speed. The valve amplifies the relatively small fluid control signal therewithin to effect control of relatively high pressure fluid being supplied from a fluid source to the hydraulic motor.

The valve comprises a movable poppet whose position determines the rate of flow of high pressure fluid between a fluid inlet connected to a pump and a controlled fluid outlet port connected to the hydraulic motor, a movable piston for positioning the poppet, a movable shut-off member for regulating piston position by controlling fluid pressure applied to the piston from the fluid inlet, and an adjustable and movable cam to establish the position of the shut-off member to thereby control fluid flow to the motor and thereby control conveyor speed. The cam comprises a plurality of differently shaped cam segments, and is manually adjustable initially to enable the selection of a desired segment. The cam is movable by the sensing means across the range of the selected cam segment to provide fluid flow between zero and some maximum flow rate at the controlled fluid outlet port, rate of flow being determined by the position and the shape of the selected cam segment. The four cam segments, for example, enable flow rates between 0 to 4 gallons per minute (gpm), 0 to 5 gpm, 0 to 6 gpm, and so on, depending on the number and shape of segments on the cam surface.

The flow control valve in accordance with the invention and disclosed herein comprises a housing having a bore therein, a drain cavity separated from the bore, a fluid inlet port communicating with the first chamber, a controlled flow outlet port communicating with the inlet port, and a drain outlet port communicating with the drain cavity. A piston is slideable in the bore and divides the bore into first and second chambers. A piston rod is connected to the piston and extends through the first chamber and into the drain cavity. A poppet is connected to the piston and extends through the second chamber and is movable to control fluid flow from the inlet port to the controlled flow outlet port. An orifice extends through the piston rod and communicates between the first chamber and the drain cavity. A passage communicates between the drain cavity and the second chamber. A shut-off member is mounted for relative movement with respect to the piston rod to control fluid flow through the piston rod orifice. An adjustably movable cam is mounted in the housing for controlling the position of the shut-off member to thereby control fluid flow through the orifice and thus the position of the piston, the piston rod and the poppet to control fluid flow between the inlet port and the controlled flow outlet port.

In the embodiment disclosed, the valve takes the form of a low torque non-compensated two-way flow control valve but the invention can be embodied in other types of valves, such as compensated valves, and valves capable of handling fluid at higher or lower pressures.

A valve in accordance with the invention enables the operator to select any one of several different ranges of flow rates, each range being between zero gpm and some specific flow rate. A valve in accordance with the invention is relatively simple in basic design and economical to manufacture, employs a minimum number of component parts, and is reliable in use. Since a valve in accordance with the invention enables a single valve to be preset or adjusted to operate in different flow rate ranges, a single type of valve can be used to substitute for or replace several types of valves of different sizes. This provides for standardized and simplified inventory. A valve in accordance with the invention, although capable of controlling fluid at high system pressures, utilizes amplification whereby a very low pressure signal within the valve and capable of being controlled by low torque applied to the cam for movement thereof, effects fine control of fluid at high system pressure. In addition, the valve in accordance with the invention is constructed so that sealing against leakage of high pressure fluid is more simply and surely carried out.

BRIEF DESCRIPTION OF THE DRAWINGS

FIG. 2 is a cross sectional view of a cam regulated flow control valve in accordance with the invention and showing the controlled flow fluid outlet port fully closed;

FIG. 3 is a cross-sectional view taken on line 3—3 of FIG. 2 and showing the structure of the cam and means for adjusting cam position;

FIG. 4 is a view taken on line 4—4 of FIG. 3; and

DESCRIPTION OF A PREFERRED EMBODIMENT OF THE SYSTEM

Figure 1:
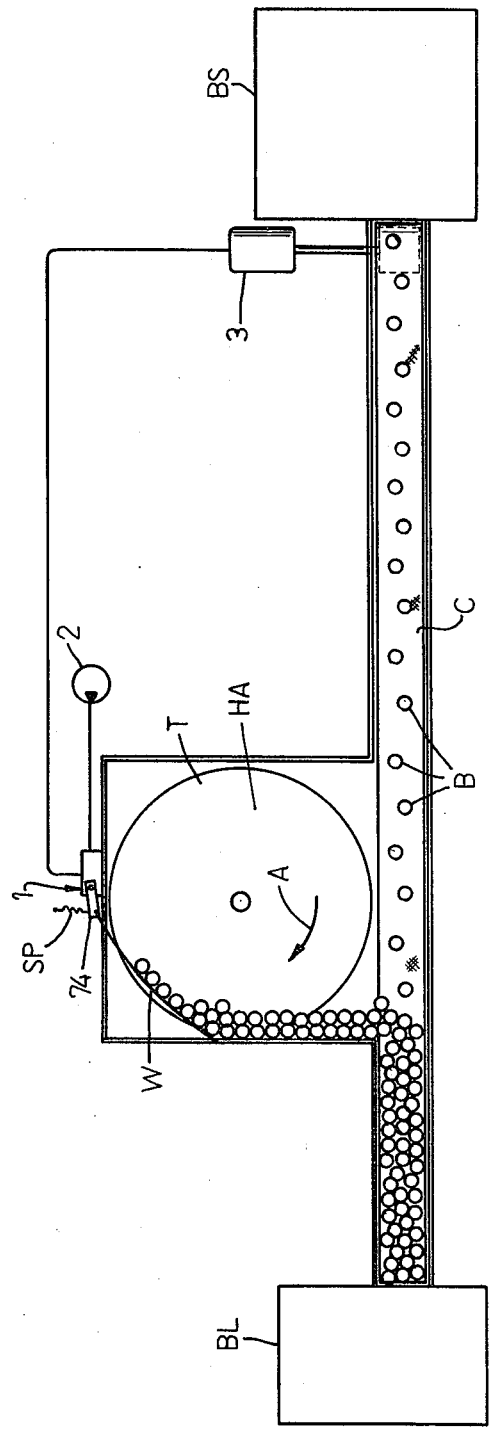
FIG. 1 is a top plan view in schematic form of a conveyor system in which a valve in accordance with the invention is advantageously employed.

Referring to FIG. 1, there is shown a conveyor system which comprises a conveyor C drivable at variable speeds by a hydraulic motor 3, which motor is controlled by a cam regulated flow control valve 1 in accordance with the present invention. Conveyor C is adapted to transport articles such as bottles B, from a bottle supply BS to a bottler machine BL. In practice, it sometimes happens that bottler BL cannot handle the bottles B at the rate at which they are being delivered by conveyor C and it is necessary to make provision for temporarily storing or holding the bottles until the condition is corrected and also to sense that the obstruction exists so that the conveyor drive motor 3 can be slowed down to slow down the conveyor C. As FIG. 1 shows, conveyor C is associated with a holding area assembly HA which includes a table T rotatable in the direction of arrow A for removing bottles backing up on conveyor C and temporarily storing them. As bottles B accumulate on table T, they are forced against a wire pull line W which has one end anchored in fixed position and has its other end connected to a lever 74 hereinafter described, which is connected to a cam 70 in valve 1 hereinafter described. Lever 74 is normally biased into open position by a tension spring SP (also shown in FIG. 4) and normally causes cam 70 to be maintained in a position wherein valve 1 is open. As wire W moves in response to accumulation of bottles B thereagainst, lever 74 is gradually moved from its open position toward its closed position thereby effecting corresponding movement of cam 70 and a corresponding decrease in the rate of flow of fluid through valve 1 to conveyor drive motor 3. This results in a slow down of conveyor C and the surplus collection of bottles B in holding area HA is gradually removed and directed by conveyor C to bottler BL. As this occurs, the tension on wire pull line W eases and lever 74 and its associated cam 70 gradually return to open position thereby effecting an increase in the rate of fluid flow through valve 1 to conveyor drive motor 3. The wire W, lever 74, and spring SP serve as a sensing means which is responsive to a system condition on the conveyor requiring a change in speed (i.e., excessive accumulation of conveyed articles, such as bottles, requiring a slow down of conveyor C). As hereinafter explained in detail, the cam 70 of valve 1 has four cam segments designated 70A–70D. During initial set up of the system shown in FIG. 1, the operator selects one of the four cam segments to govern the desired maximum rate of flow and moves cam 70 to the desired position. Thereupon, he adjusts lever 74 on cam shaft 71 by means of set screw 80 so that the movement of wire W will effect movement of lever 74 to cause cam 70 to be able to operate across the entire range of the particular cam segment chosen. This results in possible flow rates of, for example, between zero and some particular maximum flow rate.

The valve 1 comprises a movable poppet 40 whose position determines the rate of flow of high pressure fluid between a fluid inlet port 16 connected to pump 2 and a controlled fluid outlet port 18 connected to the hydraulic motor 3, a movable piston 10 for positioning the poppet 40, a movable shut-off member 55 for regulating piston position by controlling fluid pressure applied to the piston 10 from the fluid inlet port 16, and the adjustable and movable cam 70 to establish the position of the shut-off member 55 to thereby control fluid flow to the motor 3 and thereby control conveyor speed. The cam 70 comprises a plurality of differently shaped cam segments 70A, 70B, 70C, 70D, and is manually adjustable initially to enable the selection of a desired segment. The cam 70 is movable by the sensing means hereinbefore described across the range of the selected cam segment to provide fluid flow between zero and some maximum flow rate at the controlled fluid outlet port, rate of flow being determined by the position and the shape of the selected cam segment. The four cam segments, for example, enable flow rates between 0 to 4 gpm, 0 to 5 gpm, 0 to 6 gpm, and so on, depending on the number and shape of segments on the cam surface.

DESCRIPTION OF A PREFERRED EMBODIMENT OF THE VALVE

Referring to FIG. 2, the numeral 1 designates a flow control valve in accordance with the invention which is used, for example, to regulate fluid flow from a fluid source 2 to a piece of equipment 3 which is to be supplied with fluid, such as a fluid motor or the like. Valve 1 generally comprises a housing 4 conveniently fabricated in three sections such as inlet section 4A, intermediate section 4B, and outlet section 4C. These sections are understood to be rigidly secured together as by means of the screws or bolts 5 shown in FIG. 2. Suitable seals such as elastomer rings 6 are employed to seal the interconnection of fluid passages hereinafter described between the housing sections. Housing 4 comprises a bore 7 in intermediate section 4B, which bore is enclosed at its ends by means of chamber walls 8 and 9. Bore 7 accommodates a slideably movable piston 10 therein and the piston cooperates with the end walls 8 and 9 to define fluid chambers 12 and 13, respectively, in bore 7. Housing 4 further comprises a drain cavity 15 which is separated from chamber 12 by end wall 8; a fluid inlet port 16 which communicates with chamber 12 by means of a passage 17; a controlled flow fluid outlet port 18 which communicates with the inlet port 16; and a drain outlet port 19 which communicates through a passage 20 with the drain cavity 15. The end walls 8 and 9 are provided with suitable elastomer seals 21 to prevent fluid flow therepast and with seals 22 which prevent fluid flow through the openings 24 and 25 in the end walls 8 and 9. Piston 10 is also provided with an elastomer seal 26.

Fluid inlet port 16 is connected to passage 17 by means of a recess 30 in which a filter 31 is disposed, such filter being held in place by means of a compression spring 32 maintained in recess 30 by means of a removable threaded plug 33. Removal of the plug 33 and the spring 32 enables the filter screen 31 to be removed for cleaning. Screen 31 prevents contamination from entering metering plug 36.

Passage 17 is connected to chamber 12 of bore 7 through a hole 35 in a threaded removable metering plug 36. Access to plug 36 is afforded by a removable threaded plug or sealing member 37.

Figure 5:
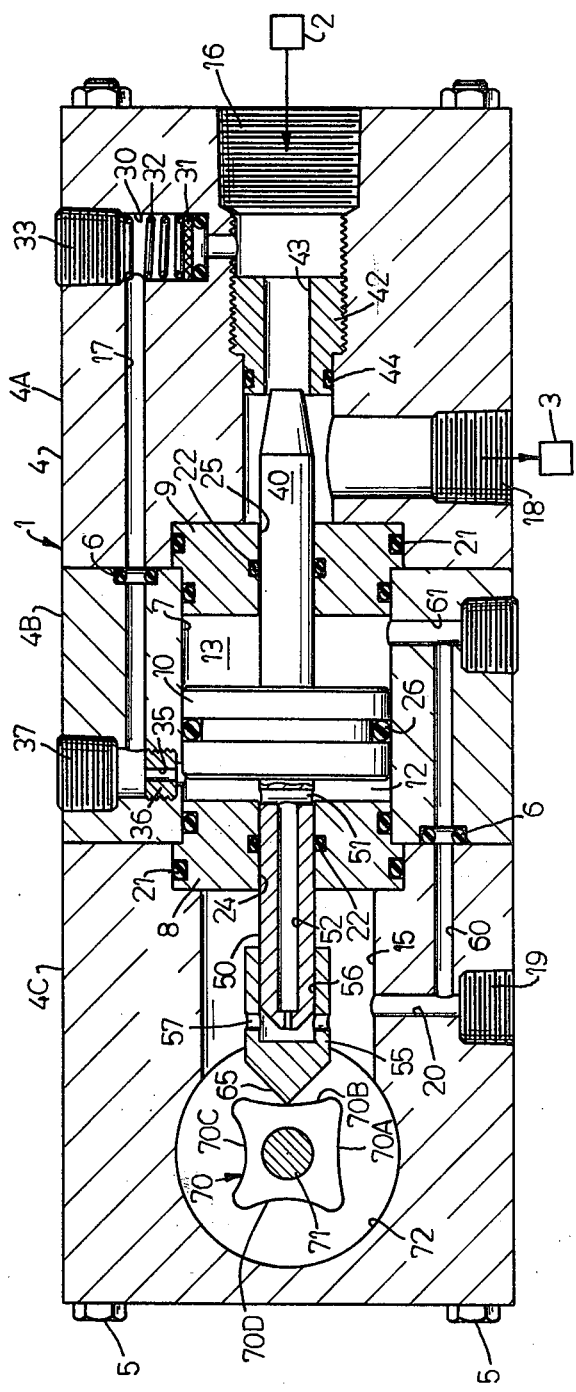
FIG. 5 is a view similar to FIG. 2 but showing the controlled fluid outlet port fully open.

A poppet 40 in the form of a cylindrical member having a tapered end is rigidly connected to and movable with the piston 10. The tapered end of poppet 40 is releasably engagable with a valve seat assembly 42 which has an opening 43 therethrough. Valve seat assembly 42 is provided with external threads whereby it can be removably inserted into position and is also provided with an elastomer seal 44. Poppet 40 extends through opening 25 in end wall 9. In FIG. 2, poppet 40 is shown in closed position; and in FIG. 5 it is shown in fully opened position.

A piston rod 50 is connected to and movable with piston 10. Piston rod 50 extends between chamber 12 or bore 7 and drain cavity 15 through the opening 24 in end wall 8. Piston rod 50 is provided with a cross-drilled orifice comprising passages 51 and 52 which afford communication for fluid flow between chamber 12 and drain cavity 15. A shut-off cap 55 having a cylindrical bore 56 extending thereinto is slideably mounted on the end of piston rod 50. Bore 56 communicates by means of cross-drilled holes 57 in shut-off cap 55 with drain cavity 15. Drain cavity 15 in addition to communicating with drain port 19 also communicates by means of passage 20, a passage 60, and a passage 61 with chamber 13 in bore 17, thereby enabling fluid to enter or exit chamber 13 as piston 10 moves as hereinafter explained. Shut-off cap 55 has a tapered end 65 which functions or serves as a cam follower and is in engagement with a cam 70. As hereinafter explained, shut-off cap 55 is axially movable or slideable with respect to piston rod 50 and, depending on its relative position with respect thereto, increases or decreases the fluid flow from chamber 12, through orifice 52, cross-drilled openings 57, into drain cavity 15. The positioning of shut-off cap 55 is determined by the position and shape of cam 70 as hereinafter explained.

As FIGS. 2, 3, 4, 5 show, cam 70 is rigidly secured to a rotatable shaft 71 which extends through the removable walls 69 of housing 4 from the outside of the housing to a cavity 72 in the housing, which cavity 72 is in communication with drain cavity 15. The exterior portion of shaft 71 is provided with an operator's handle 74 by means of which the cam 70 can be moved to different operating positions. As hereinafter explained, the position of the cam 70 determines the position of shut-off cap 55 which in turn determines the position of piston 10 and poppet 40, thereby determining the rate of flow of fluid from inlet port 16, past valve seat 42, to controlled flow port 18. As FIG. 2 shows, cam 70 is provided with four distinct cam segments or surfaces designated 70A, 70B, 70C, and 70D. Each of these cam segments extends through 90° of the circumference of the cam. However, each cam segment has a different degree of slope or curvature, the curvature increasing from segment 70A through 70D. The cam segments are shaped, however, so that the effective cam surface of each cam segment extends through an arc of only 70°. Each half of the effective cam surface encompasses 35° of arc. As the cam is moved through the effective 35° segment, it positions cam follower 65 on shut-off cap 55 in different positions. For example, when cam segment 70A is operative, flow rate will vary between zero gallons per minute to 4 gallons per minute. Segments 70B, 70C, and 70D for example, enable effective flow rates from controlled flow port 18 of from 0 to 5 gpm, from 0 to 6 gpm, and from 0 to 8 gpm, respectively. Both right hand and left hand rotation of cam 70 is possible in any quadrant or cam segment depicted.

Valve 1 operates as follows. A fluid such as oil is admitted to inlet port 16 from source 2. If the valve is closed, as shown in FIG. 2, oil is unable to reach controlled flow outlet port 18. However, oil from inlet 16 travels through passages 30, 17, and 35 to chamber 12 thereby acting against piston 10 and forcing it to the right (in FIG. 2) to move poppet 40 to closed position. This action to effect closure of valve 1 occurs whenever the cam follower portion 65 of shut-off cap 55 is in contact with any of the four high points on cam 70. In this condition, oil flow from chamber 12 through passages 51, 52, and 57 is at a minimum and pressure build-up in chamber 12 maintains the valve closed. To effect full flow of oil to controlled flow port 18, it is necessary to effect movement of poppet 40 from the position shown in FIG. 2 to the position shown in FIG. 5.

This is accomplished by employing shaft 71 to move cam 70 to allow the shut-off cap 55 to ride on whichever of the four cam surfaces 70A–70D is selected as the desirable range of possible flow rates. The position of poppet 40 is determined by the position of piston 10. Oil from inlet port 16 then bleeds through screen 31, passages 30, 17, and 35 to chamber 12. From chamber 12 the oil flows through passages 51, 52, and 57 in piston rod 50. As hereinbefore mentioned, the position of shut-off cap 55 controls the flow of oil through the ports 57 in cap 55. Since the position of cam 70 as shown in FIGS. 2 and 3 enables the shut-off cap 55 to move away from piston 10, more oil is able to drain from chamber 12 into drain cavity 15 and from thence to drain port 19 thereby enabling the piston to move leftward (in FIG. 2) causing corresponding leftward movement of poppet 40 and opening the passage between inlet port 16 and controlled flow outlet port 18 to an extent proportional to the shape and point selected on the cam segment 70A–70D. Such movement also results in leftward movement of piston rod 50 thereby effecting partial or full closure of the ports 57 in shut-off cap 55. The size of the opening which determines the rate of flow of fluid into drain cavity 15 and as oil drains into drain cavity 15 the piston rod 50, the piston 10, and the poppet 40 become followers of the position of shut-off cap 55.

Since the mechanical force levels needed to move shut-off cap member 55 are very small, the resultant torque required to rotate cam 70 is also very low and is determined essentially only by seal friction.

As hereinbefore explained, cam 70 is designed to give various rates of flow across each of the four cam segments. Within any 35° arc of an individual cam segment, fluid flow can be varied from zero to some particular flow rate. By rotating the cam 70 through 90°, different sloped segments spanning the 35° range are presented to the cam follower end 65 of shut-off cap 55. A valve such as valve 4 can have typical flow rates, for example, such as 0 to 4 gpm on segment or quadrant 70A. 0–5 gpm on segment 70B, 0–6 gpm on segment 70C, and 0–8 gpm on segment 70D. Both right and left hand rotation of cam 70 is possible in each of the four quadrants.

In the embodiment shown, cam 70 has four segments, each having a different slope or shape or curve. However, a cam having a greater or less or number of segments and having differently shaped segments could be employed to achieve various ranges of flow rates and flow rates having different upper limits for each segment. Furthermore, cam 70 could be positioned manually as shown or mechanically or electrically if suitable means were provided therefor. Also, the manner in which the valve housing and valve components are constructed and arranged could be carried out in a manner other than that shown.

As FIG. 3 shows, the retainer walls or plugs 69 are removably held in place by screws 81. Each retaining plug 69 is provided with suitable seals 82 for preventing leakage past the outer edges thereof and with additional seals 83 for preventing fluid leakage past the shaft 71. Ball bearing assemblies 85 are provided on the plugs 69 to support shaft 71 in a conventional manner to allow rotation of the shaft.

We claim:

1. In a flow control valve:
   a housing having a bore, a fluid flow passage, and a drain cavity therein;
   a piston slideable in said bore and dividing said bore into first and second chambers;
   first and second separation means for separating said first and second chambers of said bore, respectively, from said drain cavity and from said fluid flow passage, respectively;
   said housing having a fluid inlet port and a controlled flow outlet port which communicate with said fluid flow passage, said housing having a drain outlet port communicating with said drain cavity;
   a piston rod connected to said piston and extending through said first separation means into said drain cavity;
   a poppet connected to said piston and extending through said second separation means into said fluid flow passage to control fluid flow from said fluid inlet port to said controlled flow outlet port;
   a first passage communicating between said inlet port and said first chamber;
   a second passage communicating between said drain outlet port and said second chamber;
   a third passage extending through said piston rod and communicating beween said first chamber and said drain cavity;
   a shut-off member movably mounted on said piston rod and movable to control fluid flow through said third passage;
   a movable cam mounted in said drain cavity and operatively connected to said shut-off member for controlling the axial position of said shut-off member relative to said piston rod to control fluid flow from said first chamber into said drain cavity and to thereby control the position of said piston, said piston rod and said poppet and thereby enable said poppet to control fluid flow from said fluid inlet port to said controlled flow outlet port;
   and means for moving said cam to effect movement of said poppet.

2. A flow control valve according to claim 1 wherein said means for moving said cam comprises a shaft on which said cam is mounted and whereby rotation of said cam relative to said shut-off member is effected.

3. A flow control valve according to claim 2 wherein said shaft is accessible from the exterior to said housing.

4. A flow control valve according to claim 1 wherein said cam comprises a plurality of cam segments, said cam being adjustably positionable initially so as to present a desired one of said cam segments for cooperation with said shut-off member, each cam segment being shaped so as to enable the fluid flow rate of said flow control valve to be adjusted between zero and a predetermined maximum rate of flow in response to operation of said means for moving said cam, the predetermined maximum fluid flow rates for said cam segments being different from each other.

5. A flow control valve according to claim 4 wherein said means for moving said cam comprises a shaft on which said cam is mounted and whereby rotation of said cam relative to said shut-off member is effected and whereby positioning of a desired cam segment relative to said shut-off member is presented.

6. A flow control valve according to claim 5 wherein said shaft is accessible from the exterior of said housing.

7. A flow control valve according to claim 1 wherein said housing comprises three separable sections and means for securing said sections together, said first section containing said fluid flow passage, a second section containing said bore, and a third section containing said drain cavity; and wherein said first and second separation means take the form of members which are secured by entrapment between adjacent sections of said housing, said first and second separation members having holes therethrough for accommodating said piston rod and said poppet, respectively.

8. A flow control valve according to claim 7 wherein said drain cavity comprises a first bore extending axially into said third section of said housing and a second bore extending transversely through said third section of said housing and intersecting said first bore, and said housing comprises means for sealing said transversely extending bore.

9. A flow control valve according to claim 8 including a shaft on which said cam is mounted, and wherein said means for sealing said transversely extending bore includes means for rotatably supporting said shaft.

* * * * *